United States Patent
Park et al.

(10) Patent No.: US 10,679,121 B2
(45) Date of Patent: *Jun. 9, 2020

(54) SYNAPSE AND A NEUROMORPHIC DEVICE INCLUDING THE SAME

(71) Applicant: SK hynix Inc., Icheon (KR)

(72) Inventors: Sang-Su Park, Icheon (KR); Hyung-Dong Lee, Icheon (KR)

(73) Assignee: SK hynix Inc., Icheon (KR)

( * ) Notice: Subject to any disclaimer, the term of this patent is extended or adjusted under 35 U.S.C. 154(b) by 825 days.

This patent is subject to a terminal disclaimer.

(21) Appl. No.: 15/389,101

(22) Filed: Dec. 22, 2016

(65) Prior Publication Data

US 2017/0193356 A1 Jul. 6, 2017

Related U.S. Application Data

(60) Provisional application No. 62/273,228, filed on Dec. 30, 2015.

(30) Foreign Application Priority Data

Nov. 4, 2016 (KR) .......................... 10-2016-0146577

(51) Int. Cl.
*G06N 3/063* (2006.01)

(52) U.S. Cl.
CPC .................................. *G06N 3/0635* (2013.01)

(58) Field of Classification Search
CPC .................................................... G06N 3/0635
See application file for complete search history.

(56) References Cited

U.S. PATENT DOCUMENTS

| | | | |
|---|---|---|---|
| 8,502,343 B1* | 8/2013 | Jha | H04L 45/08 257/536 |
| 9,583,701 B1* | 2/2017 | Gee | H01L 45/1266 |
| 2011/0004579 A1* | 1/2011 | Snider | G06N 3/049 706/25 |
| 2014/0061568 A1 | 3/2014 | Ramaswamy et al. | |

(Continued)

FOREIGN PATENT DOCUMENTS

KR 10-2017-0045872 A 4/2017

OTHER PUBLICATIONS

Zhao, "Multi-level control of conductive nano-filament evolution in Hf02 Re RAM by pulse-train operations", Nanoscale, 2014, 6, 5698-5702 (Year: 2014).*

*Primary Examiner* — Kamran Afshar
*Assistant Examiner* — Imad Kassim (57) ABSTRACT

A neuromorphic device includes a synapse. The synapse includes a first electrode, a second electrode spaced apart from the first electrode, an oxygen-containing layer disposed between the first electrode and the second electrode, the oxygen-containing layer including oxygen ions, and a stack structure disposed between the oxygen-containing layer and the second electrode, the stack structure including a plurality of reactive metal layers alternately arranged with a plurality of oxygen diffusion-retarding layers. The plurality of reactive metal layers are capable of reacting with oxygen ions of the oxygen-containing layer. The plurality of oxygen diffusion-retarding layers interfere with a movement of the oxygen ions from the oxygen-containing layer to the plurality of reactive metal layers.

18 Claims, 6 Drawing Sheets

(56) References Cited

U.S. PATENT DOCUMENTS

| | | | |
|---|---|---|---|
| 2015/0200363 A1* | 7/2015 | Sacchetto | G11C 13/0007 |
| | | | 365/148 |
| 2017/0109624 A1 | 4/2017 | Park et al. | |
| 2017/0193365 A1* | 7/2017 | Park | G06N 3/08 |
| 2017/0271591 A1* | 9/2017 | Jackson | H01L 45/08 |

* cited by examiner

SYNAPSE AND A NEUROMORPHIC DEVICE INCLUDING THE SAME

CROSS-REFERENCE TO RELATED APPLICATIONS

The present application claims priority to U.S. Provisional Patent Application No. 62/273,228, filed on Dec. 30, 2015, and Korean Patent Application No. 10-2016-0146577, filed on Nov. 4, 2016, which are incorporated herein by reference in their entirety.

BACKGROUND

1. Field

Exemplary embodiments of the present disclosure relate to neuromorphic devices that mimic a human nervous system, and their applications.

2. Description of the Related Art

Recently, as electronic appliances trend toward miniaturization, low power consumption, high performance, multi-functionality, and so on, technology capable of efficiently processing large-volume information has been demanded. In particular, neuromorphic technology for mimicking neurobiological architectures present in a human nervous system has received much attention to implement the technology of efficiently processing large-volume information. The human nervous system includes several thousand billions of neurons and synapses serving as junctions between the respective neurons. In the neuromorphic technology, neuron circuits and synapse circuits, which correspond to neurons and synapses of the human nervous system, respectively, are designed to realize neuromorphic devices. The neuromorphic devices may be used in various applications including data classification, pattern recognition, and the like.

SUMMARY

Embodiments of the present disclosure are directed to a synapse having enhanced symmetry and linearity, and to a neuromorphic device including the same.

In accordance with an embodiment, a synapse includes: a first electrode; a second electrode spaced apart from the first electrode; an oxygen-containing layer disposed between the first electrode and the second electrode, the oxygen-containing layer including oxygen ions; and a stack structure disposed between the oxygen-containing layer and the second electrode, the stack structure including a plurality of reactive metal layers alternately arranged with a plurality of oxygen diffusion-retarding layers, wherein the plurality of reactive metal layers are capable of reacting with oxygen ions of the oxygen-containing layer, and wherein the plurality of oxygen diffusion-retarding layers interfere with a movement of the oxygen ions from the oxygen-containing layer to the plurality of reactive metal layers.

In the above embodiment, a dielectric oxide layer is formed or disappears according to a voltage or current applied to the first electrode and the second electrode, the dielectric oxide layer being formed in at least one of the plurality of reactive metal layers at an interface with a corresponding one of the plurality of oxygen diffusion-retarding layers when the at least one of the plurality of reactive metal layers reacts with the oxygen ions. As a thickness of the dielectric oxide layer increases, an electrical conductivity of the synapse decreases, and as the thickness of the dielectric oxide layer decreases, the electrical conductivity of the synapse increases. A thickness of the dielectric oxide layer increases when a number of first electrical pulses applied to the synapse increases, the first electrical pulses having a first polarity, the first electrical pulses being applied to the synapse through the first and second electrodes, and wherein the thickness of the dielectric oxide layer decreases when a number of second electrical pulses applied to the synapse increases, the second electrical pulses having a second polarity opposite to the first polarity, the second electrical pulses being applied to the synapse through the first and second electrodes. The first electrical pulses have a constant width and a constant magnitude, and the second electrical pulses have a constant width and a constant magnitude. Each of the oxygen diffusion-retarding layers has a thickness incompletely blocking the movement of the oxygen ions. Each of the oxygen diffusion-retarding layers comprises a dielectric material, a semiconductor material, or a combination thereof. The synapse further comprises: a resistance layer located between the first electrode and the oxygen-containing layer, or between the second electrode and the stack structure, or both, the resistance layer increasing a resistance value of the synapse. The resistance layer comprises a dielectric material, a semiconductor material, or a combination thereof. The synapse undergoes a depression operation when an electrical conductivity of the synapse decreases as a number of first electrical pulses applied to the synapse increases, the first electrical pulses having a first polarity and being applied to the synapse through the first and second electrodes, and wherein the synapse undergoes a potentiation operation when the electrical conductivity of the synapse increases as a number of second electrical pulses increases, the second electrical pulses having a second polarity opposite to the first polarity and being applied to the synapse through the first and second electrodes. A change in the electrical conductivity of the synapse in the potentiation operation is substantially symmetric with a change in the electrical conductivity of the synapse in the depression operation. A rate of change in the electrical conductivity of the synapse in each of the potentiation operation and the depression operation is substantially constant. The first electrical pulses have a constant width and a constant magnitude, and the second electrical pulses have a constant width and a constant magnitude. The electrical conductivity of the synapse is constant when at least one of a width and a magnitude of each of third electrical pulses applied to the synapse is less than a certain critical value, the third electrical pulses having the first polarity or the second polarity.

In accordance with another embodiment, a neuromorphic device includes: a first neuron; a second neuron; a first line connected to the first neuron, the first line extending in a first direction; a second line connected to the second neuron, the second line extending in a second direction crossing the first direction; and a synapse disposed between the first line and the second line in a third direction, the synapse being located at an intersection region between the first line and the second line, the third direction being perpendicular to the first and second directions, wherein the synapse comprises: an oxygen-containing layer including oxygen ions; and a stack structure disposed between the oxygen-containing layer and the second line, the stack structure including a plurality of reactive metal layers alternately arranged with a plurality of oxygen diffusion-retarding layers, wherein the plurality of reactive metal layers are capable of reacting with oxygen ions of the oxygen-containing layer, and wherein the plurality of oxygen diffusion-retarding layers interfere with a movement of the oxygen ions from the oxygen-containing layer to the plurality of reactive metal layers.

In the above embodiment, a dielectric oxide layer is formed or disappears according to a voltage or current applied to the synapse through the first line and the second line, the dielectric oxide layer being generated in at least one of the plurality of reactive metal layers at an interface with a corresponding one of the plurality of oxygen diffusion-retarding layers when the at least one of the plurality of reactive metal layers reacts with the oxygen ions. An electrical conductivity of the synapse decreases as a thickness of the dielectric oxide layer increases, and the electrical conductivity of the synapse increases as the thickness of the dielectric oxide layer decreases. The first neuron and the second neuron are configured to drive, through the first line and the second line, the synapse with first electrical pulses having a first polarity or second electrical pulses having a second polarity opposite to the first polarity, wherein a thickness of the dielectric oxide layer increases with when a number of the first electrical pulses applied to the synapse increases, and wherein the thickness of the dielectric oxide layer decreases when a number of the second electrical pulses applied to the synapse increases. The first electrical pulses have a constant width and a constant magnitude, and the second electrical pulses have a constant width and a constant magnitude. The synapse further comprises: a resistance layer located between the first line and the oxygen-containing layer, or between the second line and the stack structure, or both, the resistance layer increasing a resistance value of the synapse.

DETAILED DESCRIPTION

Various examples and implementations of the disclosed technology are described below in detail with reference to the accompanying drawings.

The drawings may not be necessarily to scale and in some instances, proportions of at least some of structures in the drawings may have been exaggerated in order to clearly illustrate certain features of the described examples or implementations. In presenting a specific example in a drawing or description having two or more layers in a multi-layer structure, the relative positioning relationship of such layers or the sequence of arranging the layers as shown reflects a particular implementation for the described or illustrated example and a different relative positioning relationship or sequence of arranging the layers may be possible. In addition, a described or illustrated example of a multi-layer structure may not reflect all layers present in that particular multilayer structure (e.g., one or more additional layers may be present between two illustrated layers). As a specific example, when a first layer in a described or illustrated multi-layer structure is referred to as being "on" or "over" a second layer or "on" or "over" a substrate, the first layer may be directly formed on the second layer or the substrate but may also represent a structure where one or more other intermediate layers may exist between the first layer and the second layer or the substrate.

Figure 1:
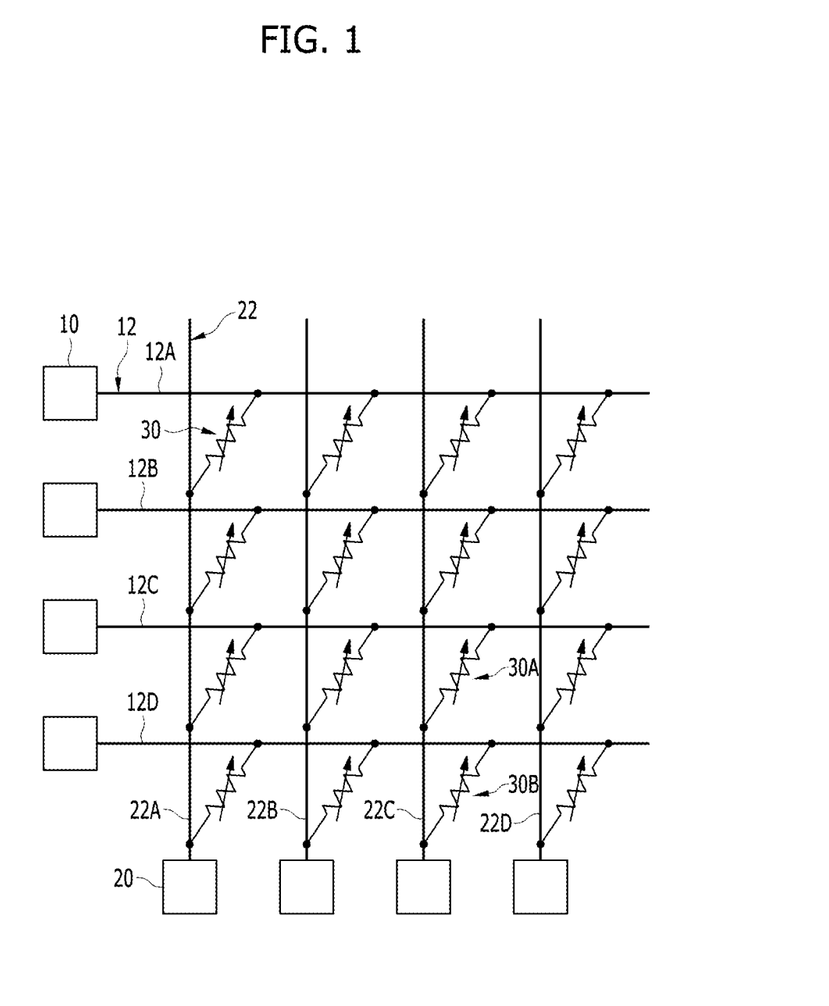
FIG. 1 illustrates a neuromorphic device according to an embodiment.

FIG. 1 illustrates a neuromorphic device according to an embodiment.

Referring to FIG. 1, the neuromorphic device according to the embodiment may include a plurality of pre-synaptic neurons 10, a plurality of post-synaptic neurons 20, and a plurality of synapses 30 that provide connections between the plurality of pre-synaptic neurons 10 and the plurality of post-synaptic neurons 20.

For illustrative convenience, the neuromorphic device of the embodiment shown in FIG. 1 includes four pre-synaptic neurons 10, four post-synaptic neurons 20, and sixteen synapses 30, but the numbers of pre-synaptic neurons, post-synaptic neurons, and synapses in the neuromorphic device may be changed in various ways. If the number of pre-synaptic neurons 10 is N and the number of post-synaptic neurons 20 is M, N*M synapses 30 may be arranged in a matrix form, wherein N and M are natural numbers equal to or greater than 2, and N and M may or may not be equal to each other.

For this arrangement shown in FIG. 1, the neuromorphic device may further include a plurality of first lines 12 and a plurality of second lines 22. The plurality of first lines 12 may be coupled to the plurality of pre-synaptic neurons 10, respectively, and may extend in a first direction, for example, a horizontal direction with respect to the orientation of FIG. 1. The plurality of second lines 22 may be coupled to the plurality of post-synaptic neurons 20, respectively, and may extend in a second direction crossing the first direction, for example, a vertical direction with respect to the orientation of FIG. 1. Hereinafter, for convenience of explanation, the first lines 12 will be referred to as row lines, and the second lines 22 will be referred to as column lines. The plurality of synapses 30 may be disposed at intersections between the row lines 12 and the column lines 22. Each of the synapses 30 may couple a corresponding one of the row lines 12 to a corresponding one of the column lines 22. In other words, the plurality of synapses 30 may be disposed in regions where the row lines 12 overlap with the column lines 22. That is, each of the synapses 30 may be disposed in an intersection region between the corresponding row line 15 and the corresponding column line 25.

The pre-synaptic neurons 10 may generate a signal (e.g., a signal corresponding to certain data) and transmit the generated signal to the row lines 12. The post-synaptic neurons 20 may receive, through the column lines 22, a synaptic signal corresponding to the signal that was generated by the pre-synaptic neurons 10 and has passed through the synapses 30, and may process the received signal.

The row lines 12 may correspond to axons of the pre-synaptic neurons 10, and the column lines 22 may correspond to dendrites of the post-synaptic neurons 20. However, whether a neuron of interest is a pre-synaptic neuron or a post-synaptic neuron may be determined by its relationship with another neuron. For example, a neuron receiving a synaptic signal from another neuron may function as a post-synaptic neuron. Similarly, a neuron transmitting a signal to another neuron may function as a pre-synaptic neuron. The pre-synaptic neurons 10 and the post-synaptic neurons 20 may be implemented using various circuits such as complementary metal-oxide-semiconductor (CMOS) circuits.

The pre-synaptic neurons 10 and the post-synaptic neurons 20 are electrically coupled by the synapses 30. Herein, the synapse 30 is an element that has an electrical conductance or a weight changing according to an electrical pulse (e.g., a voltage or current) applied to the synapse 30.

Each of the synapses 30 may include a variable resistance element. The variable resistance element is an element capable of switching between different resistance states according to a voltage or current that is applied to both ends thereof. The variable resistance element may have a single-layered structure, or may have a multi-layered structure that includes any of various materials. The single-layered structure may have a plurality of resistance states by itself. The multi-layered structure may have a plurality of resistance states by a combination of the various materials. The various materials may include any of metal oxides such as transition metal oxides or perovskite-based materials, phase-change materials such as chalcogenide-based materials, ferroelectric materials, ferromagnetic materials, and the like.

An operation in which the variable resistance element of the synapse 30 switches from a high-resistance state to a low-resistance state may be referred to as a set operation, and an operation in which the variable resistance element of the synapse 30 switches from the low-resistance state to the high-resistance state may be referred to as a reset operation.

However, unlike variable resistance elements that are used in memory devices such as RRAM, PRAM, FRAM, and MRAM devices, a resistance value of the synapse 30 in the neuromorphic device does not change abruptly in the set operation and the reset operation. Instead, the synapse 30 exhibits an analog behavior in which electrical conductivity of the synapse 30 gradually changes according to the number and/or magnitude of electrical pulses applied to the synapse 30 during the set operation and the reset operation. Thus, the synapse 30 may have various characteristics distinguishable from those of a variable resistance element of another type of memory device, because the characteristics of the synapse 30 in the neuromorphic device differ from characteristics required for a variable resistance element of another type of memory device.

On the other hand, another type of memory device preferably uses a variable resistance element that maintains its electrical conductivity before a set operation or a reset operation is performed, even if electrical pulses are repeatedly applied to the variable resistance element. Accordingly, the variable resistance element may store different data by having clearly distinguished low-resistance and high-resistance states.

Meanwhile, an example of a learning operation of the neuromorphic device of FIG. 1 will be described. For convenience of explanation, the four row lines 12 may be sequentially referred to as a first row line 12A, a second row line 12B, a third row line 12C, and a fourth row line 12D, as illustrated from the top to the bottom of FIG. 1. The four column lines 22 may be sequentially referred to as a first column line 22A, a second column line 22B, a third column line 22C, and a fourth column line 22D, as illustrated from the left to the right of FIG. 1.

Each of the synapses 30 may undergo a set operation by switching from a high-resistance state to a low-resistance state, and may undergo a reset operation by switching from a low-resistance state to a high-resistance state. An electrical conductivity of each of the synapses 30 increases during a potentiation operation, and decreases during a depression operation.

In an initial stage of the learning operation, each of the synapses 30 may be in a high-resistance state. If at least one of the synapses 30 is in a low-resistance state, an initialization operation for changing the low-resistance state of the synapses 30 to the high-resistance state may be performed in order to bring the synapses 30 to the initial stage.

Each of the synapses 30 may have a certain critical value. More specifically, if a voltage or current lower than the certain critical value is applied to the synapse 30, the electrical conductivity of the synapse 30 may not change, and if a voltage or current equal to or higher than the certain critical value is applied to the synapse 30, the electrical conductivity of the synapse 30 may change.

In the initial stage, in order to perform an operation for learning certain data in any column line 22, an input signal corresponding to the certain data may be input to the row lines 12 so that an electrical pulse is selectively applied to each of the row lines 12 according to the certain data. The input signal may be input by applying electrical pulses to row lines 12 corresponding to '1' in the certain data, and not to row lines 12 corresponding to '0' in the certain data. For example, if an input signal corresponding to certain data '0011' is input to the row lines 12 of FIG. 1, an electrical pulse may not be applied to the first and second row lines 12A and 12B, and may be applied to the third and fourth row lines 12C and 12D.

While the input signal is being input, the column lines 22 may be selectively driven at a suitable voltage or current for the learning operation.

As an example, if a column line 22 to learn specific data is predetermined, the predetermined column line 22 may be driven such that synapses 30 located at intersections between the row lines 12 corresponding to '1' and the predetermined column 22 may receive a voltage equal to or higher than a set voltage. The set voltage may be a voltage required for the set operation. Simultaneously, the remaining column lines 22, which are not the predetermined column line 22, may be driven such that the remaining synapses 30 may receive a voltage lower than the set voltage. Referring to FIG. 1, the remaining synapses are synapses other than the synapses 30 located at the intersections between the row lines 12 corresponding to '1' and the predetermined column lines 22.

For example, if the magnitude of the set voltage is Vset and the third column line 22C is predetermined as a column line to learn the certain data '0011,' the magnitude of the electrical pulse that is applied to each of the third and fourth row lines 12C and 12D may be equal to or higher than Vset, and a voltage that is applied to the third column line 22C may be 0 V, such that first and second synapses 30A and 30B located at intersections between the third column line 22C and the third and fourth row lines 12C and 12D receive a voltage equal to or higher than Vset. Thus, the first and second synapses 30A and 30B may switch from the high-resistance state to a low-resistance state. That is, each of the first and second synapses 30A and 30B may undergo the set operation.

The electrical conductivity of the first and second synapses 30A and 30B in the low-resistance state may gradually increase as the number of electrical pulses applied to the first and second synapses 30A and 30B increases. That is, each of the first and second synapses 30A and 30B may undergo a potentiation operation.

On the other hand, a voltage applied to the remaining column lines 22, that is, to the first, second, and fourth column lines 22A, 22B, and 22D, may have a magnitude between 0V and Vset such that the remaining synapses 30 receive a lower voltage than Vset. For example, the voltage applied to the remaining column lines 22 may be equal to ½

Vset. Thus, resistance states of the remaining synapses 30, which are synapses 30 other than the first and second synapses 30A and 30B, may not change.

If the row lines 12 and the column lines 22 are driven in the above-described manner, the electrical conductivity of synapses 30 that receive electrical pulses may gradually increase, and thus a current flowing through the synapses 30 that receive the electrical pulses may increase. For example, the electrical conductivity of the synapses 30A and 30B may increase when the synapses 30A and 30B receive the electrical pulses from the third and fourth row lines 12C and 12D, and a current flowing to the third column line 22C through the synapses 30A and 30B may increase. When the current flowing to the third column line 22C is measured and the measured current reaches a certain critical current, the third column line 22C may be a 'column line that has leaned specific data,' for example, a column line that has learned the certain data '0011.'

As another example, a column line 22 to learn specific data may not be predetermined. In this case, a current flowing to each of the column lines 22 is measured while electrical pulses corresponding to the specific data are applied to the row lines 12. Based on the measurement results, a column line, e.g., the first column line 22A, which reached the certain critical current before the other column lines, e.g., the second to fourth column lines 22B to 22D, may be determined to be a column line that has learned the specific data.

In the above-described manner, the other column lines may learn different data in other learning operations.

Meanwhile, although the learning operation described above includes only the set operation of changing the resistance state of the synapses 30 from a high-resistance state to a low-resistance state and the potentiation operation of increasing the electrical conductivity of the synapses 30, the learning operation may also include the reset operation of changing the resistance state of the synapses 30 from the low-resistance state to the high-resistance state and the depression operation for reducing the electrical conductivity of the synapses 30.

For example, the polarity of pulses that are applied in the set operation of the synapses 30 and the potentiation operation of increasing the electrical conductivity of the synapses 30 may be opposite to the polarity of pulses that are applied in the reset operation of the synapses 30 and the depression operation of reducing the electrical conductivity of the synapses 30.

Hereinafter, characteristics of a synapse suitable for a neuromorphic device will be described in detail with reference to FIGS. 2A to 2D.

FIGS. 2A to 2D illustrate characteristics associated with each of the synapses 30 shown in FIG. 1.

Figure 2A:
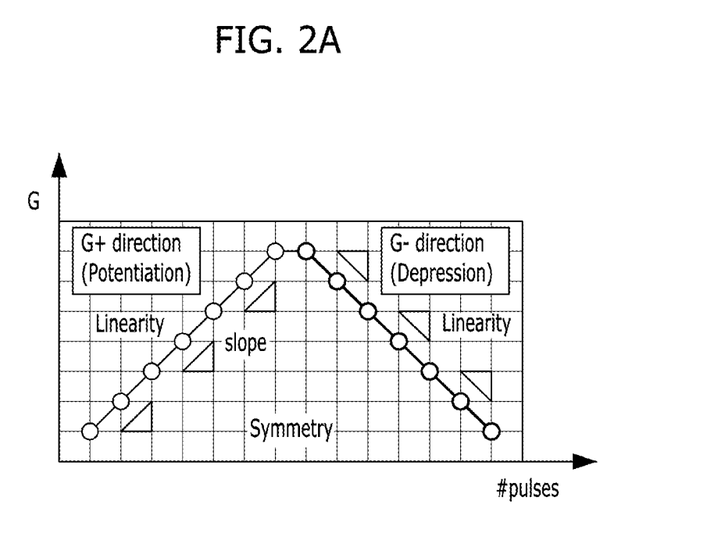
FIGS. 2A to 2D illustrate characteristics associated with synapses shown in FIG. 1.
Figure 2B:
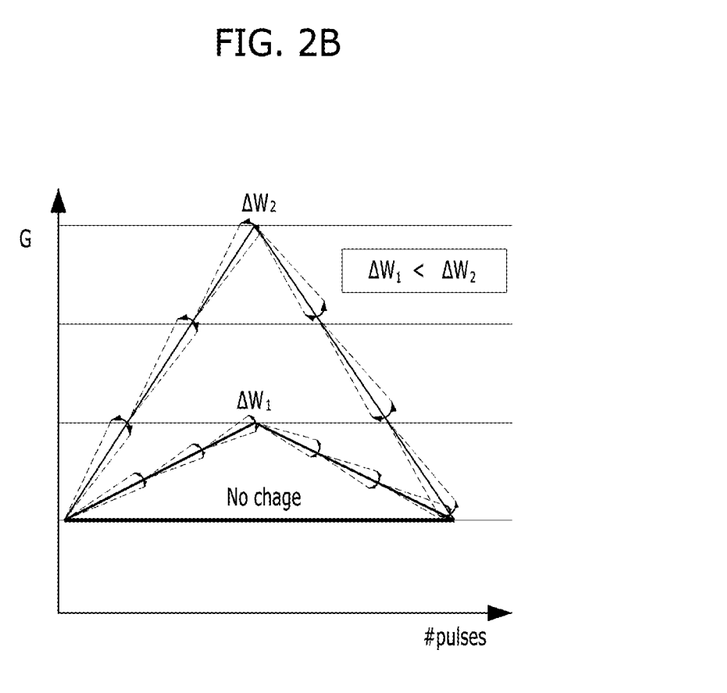
Figure 2C:
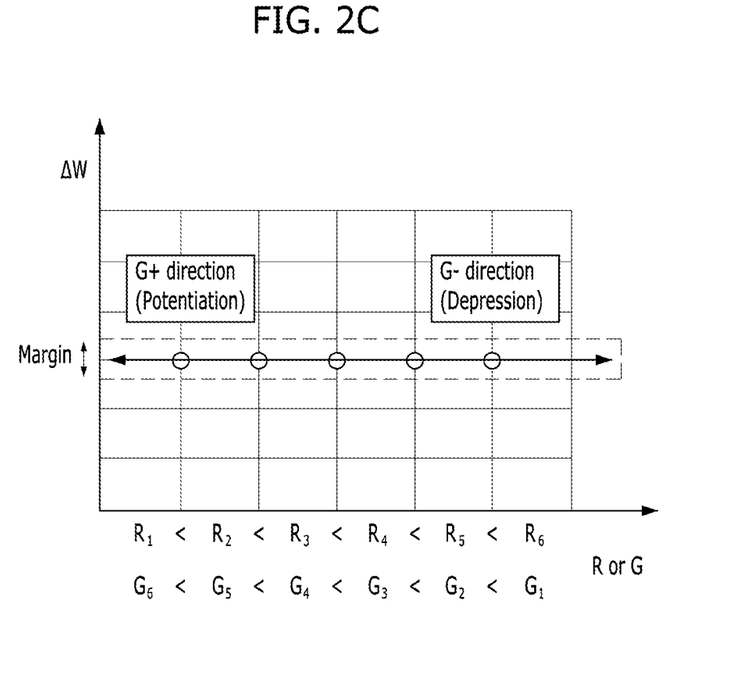
Figure 2D:
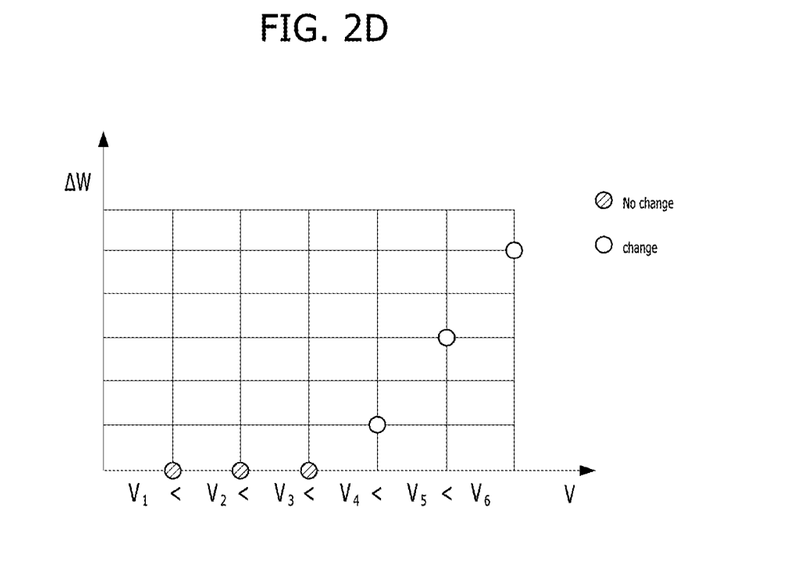

Specifically, FIGS. 2A and 2B illustrate the electrical conductivity G of a synapse 30 according to the number of electrical pulses that are applied to the synapse 30. FIG. 2C shows a change in weight ΔW of the synapse 30 with a change in resistance R or electrical conductivity G of the synapse 30. FIG. 2D shows the change in weight ΔW of the synapse 30 according to a magnitude of a voltage V that is applied to the synapse 30.

Referring to FIGS. 2A and 2B, if first-polarity voltage pulses (e.g., negative voltage pulses) with a voltage higher than a certain critical value are repeatedly applied to the synapse 30 that is in a low-resistance state, the electrical conductivity G of the synapse 30 may gradually increase. A direction in which the electrical conductivity G of the synapse 30 increases may be referred to as a G+ direction or a potentiation direction.

If second-polarity voltage pulses (e.g., positive voltage pulse) with a voltage equal to or higher than the reset voltage are applied to the synapse 30, the reset operation may be performed, such that the resistance state of the synapse 30 changes to a high-resistance state.

If second-polarity voltage pulses are repeatedly applied to the synapse 30 when the synapse 30 is in the high-resistance state, the electrical conductivity G of the synapse 30 may gradually decrease. A direction in which the electrical conductivity G of the synapse 30 decreases may be referred to as a G− direction or a depression direction.

If first-polarity voltage pulses with a voltage equal to or higher than the set voltage are applied again to this synapse 30, the set operation may be performed so that the resistance state of the synapse 30 changes again to the low-resistance state.

Herein, it is preferable that, if the magnitude and width of pluses are constant, a change in the electrical conductivity G of the synapse 30 in the potentiation operation be substantially symmetric with a change in the electrical conductivity G of the synapse 30 in the depression operation, and a rate of change in the electrical conductivity G is substantially constant in each of the potentiation operation and the depression operation. In other words, it is preferable that the electrical conductivity G of the synapse 30 has linearity and symmetry in the potentiation operation and the depression operation, such that a resistance value of the synapse 30 does not abruptly change in the set operation or the reset operation. If the magnitude and/or width of the pulses must be varied to secure the linearity and symmetry of the synapse 30, it may be necessary to implement additional circuits in the neuromorphic device to generate various pulses. The addition of additional circuits may be disadvantageous in terms of area or power. Therefore, it is preferable to control the pulses to have the constant magnitude and width while driving the synapse 30.

The linearity and symmetry of the electrical conductivity G of the synapse 30 in the potentiation operation and the depression operation may be observed in both the case in which a rate of change in the weight of the synapse 30 is small (see ΔW1 in FIG. 2B) and the case in which the rate of change in the weight of the synapse 30 is great (see ΔW2 in FIG. 2B). However, if the magnitude or width of pulses is not sufficiently large, the electrical conductivity G of the synapse 30 may not change regardless of the number of the pulses being applied to the synapse 30.

Referring to FIG. 2C, it is preferable that the rate of change in the weight ΔW of the synapse 30 be substantially constant regardless of a present state of the synapse 30, that is, the present resistance value R or present electrical conductivity G of the synapse 30.

Referring to FIG. 2D, when a voltage equal to or lower than a certain critical value is applied, for example, $V_3$, the weight W and/or electrical conductivity G of the synapse 30 may not change. Namely, the rate of change in the weight ΔW of the synapse 30 may be 0. On the other hand, at a voltage higher than the certain critical value $V_3$, for example, a voltage equal to or higher than $V_4$, the rate of change in the weight ΔW of the synapse 30 may increase. Herein, the rate of change in the weight ΔW of the synapse 30 may increase substantially in proportion to the magnitude of the voltage applied to the synapse 30.

In summary, it is preferable that the electrical conductivity G of the synapse 30 of the neuromorphic device increase or decrease substantially in proportion to the number of electrical pulses being applied to the synapse 30, regardless of the present state of the synapse 30. It is also preferable that a change in the electrical conductivity G of the synapse 30 in the potentiation operation be symmetric with a change in the electrical conductivity G of the synapse 30 in the depression operation. Herein, it is preferable that the change in the electrical conductivity G of the synapse 30 occur only at a voltage equal to or higher than the certain critical value. As the characteristics of the synapse 30 are closer to the above-described characteristics, the learning and recognition accuracy of the neuromorphic device may increase, and thus operating characteristics of the neuromorphic device may be improved.

Embodiments of the present disclosure are directed to a synapse capable of satisfying the above-described characteristics shown in FIGS. 2A to 2D to the maximum possible extent. Prior to the description of the embodiments, a synapse of a comparative example will be described.

Figure 3A:
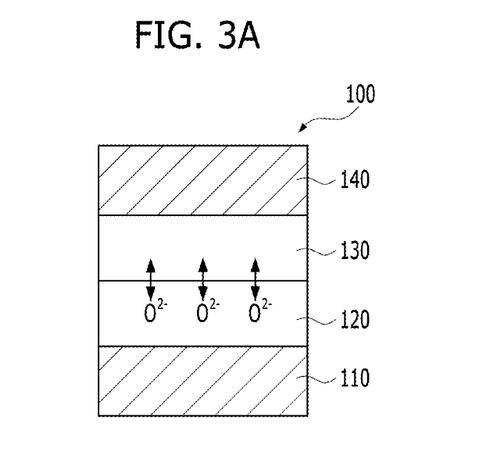
FIG. 3A is a cross-sectional view illustrating a synapse of a comparative example.
Figure 3B:
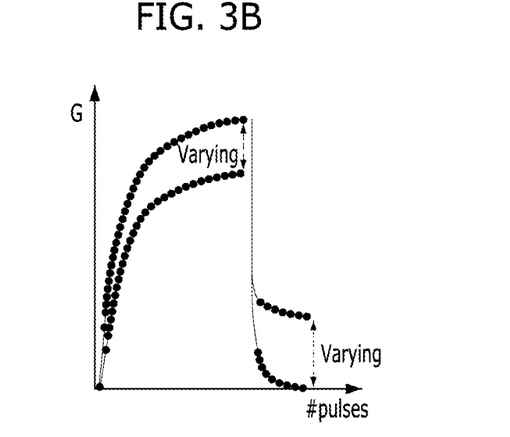
FIGS. 3B and 3C illustrate characteristics of the synapse shown in FIG. 3A.
Figure 3C:
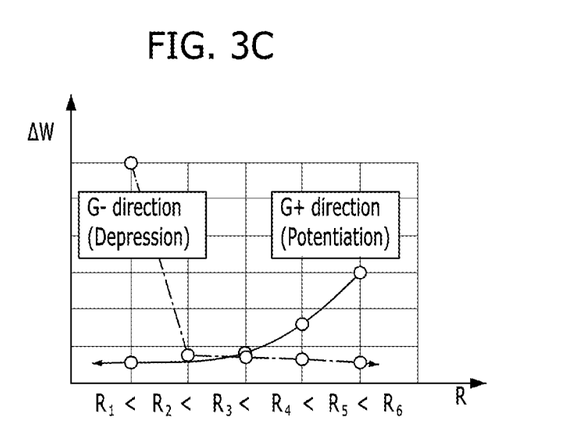

FIG. 3A is a cross-sectional view illustrating a synapse of a comparative example, and FIGS. 3B and 3C illustrate characteristics of the synapse shown in FIG. 3A.

Referring to FIG. 3A, the synapse 100 of the comparative example may include a first electrode 110, a second electrode 140, an oxygen-containing layer 120 disposed between the first electrode 110 and the second electrode 140, and a reactive metal layer 130 interposed between the oxygen-containing layer 120 and the second electrode 140. The reactive metal layer 130 is capable of reacting with oxygen ions of the oxygen-containing layer 120.

The first and second electrodes 110 and 140 may be disposed at two ends of the synapse 100 to which a voltage or current is applied, and may be formed of any of various electrically conductive materials such as metals or metal nitrides. The first electrode 110 may be connected to one of a corresponding row line 12 and a corresponding column line 22 shown in FIG. 1, and the second electrode 140 may be connected to the other one of the corresponding row line 12 and the corresponding column line 22, whereby the synapse 100 may be driven by electrical pulses. At least one of the first and second electrodes 110 and 140 may be omitted, such that the row line 12 or the column line 22 that is supposed to be coupled to the omitted electrode can function as the omitted electrode.

The oxygen-containing layer 120 is a layer containing oxygen ions, and may include any of various metal oxides, for example, oxides of transition metals such as Ti, Ni, Al, Nb, Hf, and V; perovskite-based oxides such as $Pr_{1-x}Ca_xMnO_3$ (PCMO) and $La_{1-x}Sr_xMnO_3$ (LCMO), and the like.

The reactive metal layer 130 is a layer capable of reacting with oxygen ions to form a dielectric oxide, and may include a metal such as Al, Ti, Ta, or Mo, or a nitride of the metal.

In an initial stage, the synapse 100 may be in a relatively low resistance state. Thus, to perform an operation of a neuromorphic device, an initialization operation for changing the synapse 100 from the low-resistance state to a high-resistance state may be required.

If voltage pulses with a certain polarity are applied through the first and second electrodes 110 and 140 to the synapse 100 when the synapse 100 in the low-resistance state, oxygen ions in the oxygen-containing layer 120 may move toward the reactive metal layer 130 and then react with a metal included in the reactive metal layer 130, thereby forming a dielectric oxide layer at an interface between the oxygen-containing layer 120 and the reactive metal layer 130. The dielectric oxide layer may include an oxide of the metal included in the reactive metal layer 130. As a result, the synapse 100 may undergo the reset operation and the resistance state of the synapse 100 may be changed to a high-resistance state. As the number of voltage pulses applied to the synapse 100 increases, a thickness of the dielectric oxide layer may increase, and thus the synapse 100 may undergo the depression operation such that the electrical conductivity of the synapse 100 may progressively decrease.

In contrast, if voltage pulses with a polarity opposite to the certain polarity are applied to the synapse 100 when the synapse 100 in the high-resistance state, oxygen ions may move in a direction from the reactive metal layer 130 toward the oxygen-containing layer 120, and thus the thickness of the dielectric oxide layer may decrease or the dielectric oxide layer may disappear. As a result, the synapse 100 may undergo the set operation and the resistance state of the synapse 100 may be changed to the low-resistance state. As the number of voltage pulses applied to the synapse 100 increases, the thickness of the dielectric oxide layer may decrease, and the synapse 100 may undergo the potentiation operation such that the electrical conductivity of the synapse 100 may progressively increase.

As described above, as the thickness of the dielectric oxide layer progressively increases or decreases by the voltage pulses applied to the synapse 100, the resistance state of the synapse 100 switches between the high-resistance state and the low-resistance state. Thus, the synapse 100 may have an analog behavior, such that the electrical conductivity of the synapse 100 in each of the high-resistance state and the low-resistance state progressively changes. However, this does not satisfy the characteristics described above with reference to FIGS. 2A to 2D. The characteristics of the synapse 100 will be described in detail with reference to FIGS. 3B and 3C.

Referring to FIG. 3B, if first-polarity voltage pulses are applied to the synapse 100 that is in the low-resistance state, the synapse 100 may undergo the potentiation operation and the electrical conductivity G of the synapse 100 may progressively increase as the number of the voltage pulses increases. However, a rate of increase in the electrical conductivity G is very high in an initial stage of the set operation and gradually decreases as the potentiation operation progresses. Thus, there is a problem in that the linearity of the synapse 100 is not satisfied.

In addition, if second-polarity voltage pulses with a voltage equal to or higher than a reset voltage are applied to the synapse 100 that is the low-resistance state, the reset operation may be performed such that the resistance state of the synapse 100 changes to the high-resistance state. With an increase in the number of second-polarity voltage pulses applied to the synapse 100 in the high-resistance state, the synapse 100 may undergo the depression operation and the electrical conductivity G of the synapse 100 may progressively decrease. However, an abrupt decrease in the electrical conductivity G may occur in the reset and depression operations. In addition, the rate of decrease in the electrical conductivity G is very high in an initial stage of the reset operation and gradually decreases as the depression operation progresses. The degree of decrease in the electrical conductivity G in the initial stage of the reset operation may be much larger than the degree of increase in the electrical conductivity G in the initial stage of the set operation. Thus, as shown in FIG. 3B, there is a problem in that the linearity and symmetry of the synapse 100 are not satisfied.

Referring to FIG. 3C, a rate of change in weight ΔW of the synapse 100 is not constant according to a current resistance R of the synapse 100. In the set operation, if the current resistance R of the synapse 100 is relatively high (e.g., $R_5$ or $R_6$), the rate of change in the weight $\Delta W$ of the synapse 100 may increase in the G+ direction. In other words, in the initial stage of the set operation when the synapse 100 has the relatively high resistance, the rate of change in the electrical conductivity G of the synapse 100 may be high. In contrast, in the reset operation when the current resistance R of the synapse 100 is relatively low (e.g., $R_1$), the rate of change in the weight $\Delta W$ of the synapse 100 may increase in the G− direction. In other words, in the initial stage of the reset operation when the synapse 100 has the relatively low resistance, the rate of change in the electrical conductivity G of the synapse 100 may be high. This suggests that the linearity of the synapse 100 is not satisfied.

Additionally, in the initial stage, the rate of change in the weight $\Delta W$ in the G− direction is higher than the rate of change in the weight $\Delta W$ in the G+ direction, as shown in FIG. 3C. This indicates that the symmetry of the synapse 100 is not satisfied.

The reason why the above-described problems arise are that the rate of change in the resistance R of the synapse 100 in each of the initial stages of the set and reset operations is high, and that the speed of the reset operation in which the dielectric oxide layer is formed is much higher than the speed of the set operation in which the dielectric oxide layer disappears.

Embodiments of the present disclosure are directed to synapses capable of overcoming the problems of the comparative example.

Figure 4:
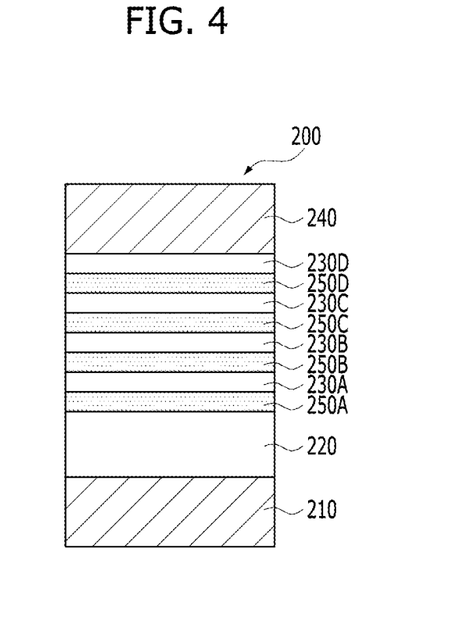
FIG. 4 is a cross-sectional view illustrating a synapse according an embodiment.

FIG. 4 is a cross-sectional view illustrating a synapse 200 according an embodiment.

Referring to FIG. 4, the synapse 200 may include a first electrode 210, a second electrode 240, an oxygen-containing layer 220 disposed between the first electrode 210 and the second electrode 240, and a stack structure disposed between the oxygen-containing layer 220 and the second electrode 240. The stack structure includes a plurality of reactive metal layers 230A, 230B, 230C, and 230D alternately stacked with a plurality of oxygen diffusion-retarding layers 250A, 250B, 250C, and 250D.

The first and second electrodes 210 and 240 may be two ends of the synapse 200 to which a voltage or current is to be applied, and may be formed of any of various electrically conductive materials such as metals or metal nitrides. The first electrode 210 may be connected to a corresponding one of the row lines 12 shown in FIG. 1, and the second electrode 240 may be connected to a corresponding one of the column lines 22, or vice versa. The synapse 200 may be driven by electrical pulses. At least one of the first and second electrodes 210 and 240 may be omitted, and in this case, the row line 12 or the column line 22 that is supposed to be coupled to the omitted electrode can function as the omitted electrode.

The oxygen-containing layer 220 is a layer containing oxygen, and may include any of various metal oxides, for example, oxides of transition metals such as Ti, Ni, Al, Nb, Hf, and V, perovskite-based oxides such as PCMO and LCMO, and the like.

Each of the reactive metal layers 230A, 230B, 230C, and 230D may react with oxygen ions to form a dielectric oxide layer, and may include a metal such as Al, Ti, Ta, or Mo, or a nitride of the metal. In this embodiment, the four reactive metal layers 230A, 230B, 230C, and 230D are shown. However, the number of reactive metal layers may be changed in various manners. Hereinafter, for convenience of explanation, the four reactive metal layers 230A, 230B, 230C, and 230D may be referred to as first to fourth reactive metal layers 230A, 230B, 230C, and 230D, respectively.

Each of the oxygen diffusion-retarding layers 250A, 250B, 250C, and 250D may be disposed between the oxygen-containing layer 220 and a corresponding one of the reactive metal layers 230A, 230B, 230C, and 230D, and may perform a function of retarding the movement of oxygen ions from the oxygen-containing layer 220 to the corresponding one of the reactive metal layers 230A, 230B, 230C, and 230D. Specifically, the first to fourth oxygen diffusion-retarding layers 250A, 250B, 250C, and 250D may retard the movement of the oxygen ions to the first to fourth reactive metal layers 230A, 230B, 230C, and 230D, respectively. In this embodiment, the four oxygen diffusion-retarding layers 250A, 250B, 250C, and 250D corresponding to the four reactive metal layers 230A, 230B, 230C, and 230D, respectively, are shown. However, the number of oxygen diffusion-retarding layers may be changed in various manners according to the number of reactive metal layers in the synapse 200. The oxygen diffusion-retarding layers 250A, 250B, 250C, and 250D may be formed of any of various semiconductor materials or any of dielectric materials such as oxides, nitrides, or combinations thereof. The oxygen diffusion-retarding layers 250A, 250B, 250C, and 250D may interfere with the movement of oxygen ions without completely blocking the movement of oxygen ions, thereby reducing a rate of formation of a dielectric oxide layer that is formed in each of the reactive metal layers 230A, 230B, 230C, and 230D at an interface with each of the oxygen diffusion-retarding layers 250A, 250B, 250C, and 250D. Each of the oxygen diffusion-retarding layers 250A, 250B, 250C, and 250D may have a thickness that does not completely block the movement of oxygen ions. That is, each of the oxygen diffusion-retarding layers 250A, 250B, 250C, and 250D may be sufficiently thin enough to pass the oxygen ions. In an embodiment, each of the oxygen diffusion-retarding layers 250A, 250B, 250C, and 250D may have a thickness of less than 10 nm.

In an initial stage, the synapse 200 may be in a relatively low resistance state. To perform an operation of a neuromorphic device, an initialization operation for changing the synapse 200 from the low-resistance state to a high-resistance state may be required.

If voltage pulses with a certain polarity are applied through the first and second electrodes 210 and 240 to the synapse 200 when the synapse 200 is in the low-resistance state, oxygen ions in the oxygen-containing layer 220 may move toward the reactive metal layers 230A, 230B, 230C, and 230D. Depending on the magnitude of voltage pulses applied to the synapse 200, the number of oxygen diffusion-retarding layers in the synapse 200, and/or a thickness of each of oxygen diffusion-retarding layers, oxygen ions may move differently. For example, the oxygen ions may move to the first reactive metal layer 230A only, to the first and second reactive metal layers 230A and 230B, to the first to third reactive metal layers 230A, 230B, and 230C, or to the first to fourth reactive metal layers 230A, 230B, 230C, and 230D. The oxygen ions may react with a metal included in the reactive metal layers 230A, 230B, 230C, and 230D, thereby forming a dielectric oxide layer at the interfaces with the oxygen diffusion-retarding layers 250A, 250B, 250C, and 250D. As a result, the synapse 200 may undergo a reset operation and the resistance state of the synapse 200 may be changed to the high-resistance state. As the number of voltage pulses applied to the synapse 200 increases, the thickness of the dielectric oxide layer may increase, and the synapse 200 may undergo a depression operation in which the electrical conductivity of the synapse 200 may progressively decrease.

In contrast, if voltage pulses with a polarity opposite to the certain polarity are applied to the synapse 200 when the synapse 200 is in the high-resistance state, oxygen ions may move from the reactive metal layers 230A, 230B, 230C, and 230D to the oxygen-containing layer 220, and thus the thickness of the dielectric oxide layer may decrease or the dielectric oxide layer may disappear. As a result, the synapse 200 may undergo a set operation and the resistance state of the synapse 200 may be changed to the low-resistance state. As the number of voltage pulses applied to the synapse 200 increases, the thickness of the dielectric oxide layer may decrease, the synapse 200 may undergo a potentiation operation and the electrical conductivity of the synapse 200 may progressively increase.

In the aforementioned operation, as the thickness of the dielectric oxide layer progressively increases or decreases by voltage pulses applied to the synapse 200, the electrical conductivity of the synapse 200 may progressively decrease or increase, respectively, as the resistance state of the synapse 200 switches between the high-resistance state and the low-resistance state. Thus, the synapse 200 may have an analog behavior, such that the electrical conductivity of the synapse 200 in each of the high-resistance state and the low-resistance state progressively changes. Specifically, a rate of forming the dielectric oxide layer may be reduced by the oxygen diffusion-retarding layers 250A, 250B, 250C and 250D, and thus an abrupt change in a resistance value of the synapse 200 in an initial stage of the reset operation may be prevented, and the speed of the reset operation may be reduced. As a result, an abrupt change in the electrical conductivity of the synapse 200 in the reset operation may be prevented. The electrical conductivity of the synapse 200 does not change abruptly in either of the set or reset operations, and thus, the symmetry of the synapse 200 may be improved.

In addition, when the oxygen diffusion-retarding layers 250A, 250B, 250C, and 250D are formed of a semiconductor material or a dielectric material, resistance values of the synapse 200 in the high-resistance state and the low-resistance state may be greater than when the oxygen diffusion-retarding layers 250A, 250B, 250C, and 250D are formed of other materials. Particularly, the resistance value of the synapse 200 in the low-resistance state is greater. Accordingly, the rate of change in the resistance value of the synapse 200 with the number of pulses applied thereto may be less, and thus an abrupt increase or decrease in the resistance value of the synapse 200 in the initial stage of the set operation or the reset operation may be prevented. As a result, the linearity of the electrical conductivity of the synapse 200 may be enhanced.

Figure 5:
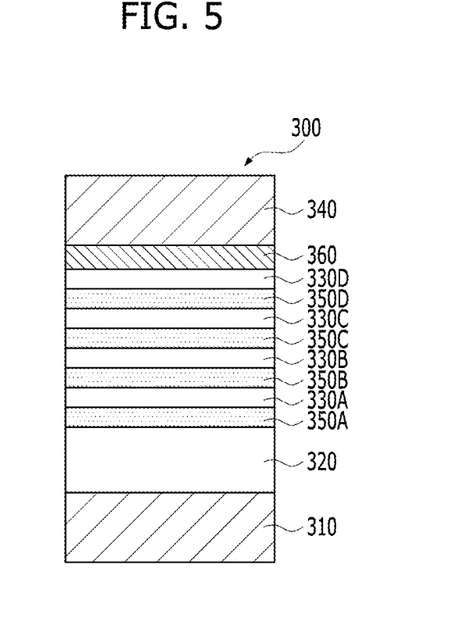
FIG. 5 is a cross-sectional view illustrating a synapse according another embodiment.

FIG. 5 is a cross-sectional view illustrating a synapse 300 according another embodiment. The detailed description of parts substantially identical to those of FIG. 4 will be omitted.

Referring to FIG. 5, the synapse 300 may include a first electrode 310, a second electrode 340, an oxygen-containing layer 320 disposed between the first electrode 310 and the second electrode 340, a stack structure disposed between the oxygen-containing layer 320 and the second electrode 340, and a resistance layer 360 disposed between the stack structure and the second electrode 340. The stack structure includes a plurality of reactive metal layers 330A, 330B, 330C, and 330D alternately stacked with a plurality of oxygen diffusion-retarding layers 350A, 350B, 350C, and 350D.

Herein, the first electrode 310, the oxygen-containing layer 320, the second electrode 340, and the stack structure of the reactive metal layers 330A, 330B, 330C, and 330D and the oxygen diffusion-retarding layers 350A, 350B, 350C, and 350D may be substantially the same as the first electrode 210, the oxygen-containing layer 220, the second electrode 240, and the stack structure of the reactive metal layers 230A, 230B, 230C, and 230D and the oxygen diffusion-retarding layers 250A, 250B, 250C, and 250D, respectively, in the embodiment shown in FIG. 4.

The resistance layer 360 may include a semiconductor material or a dielectric material, and may serve to generally increase resistance values of the synapse 300 in a low-resistance state and a high-resistance state. Particularly, the resistance value of the synapse 300 in the low-resistance state may be greater than a resistance value of a synapse that does not include a resistance layer including a semiconductor material or a dielectric material. Therefore, in comparison with the embodiment of FIG. 4, a rate of change in the resistance value of the synapse 300 with the number of pulses applied thereto may further be lower, and thus an abrupt increase or decrease in the resistance value of the synapse 300 in a set operation and a reset operation may further be prevented. As a result, the linearity of the electrical conductivity of the synapse 300 may further be enhanced in comparison to the linearity of the synapse 200 of FIG. 4.

In this embodiment, the resistance layer 360 is disposed between the second electrode 340 and the fourth reactive metal layer 330D, but the position of the resistance layer 360 may be changed in various ways. In another embodiment, the resistance layer 360 may be disposed between the first electrode 310 and the oxygen-containing layer 320 instead of between the second electrode 340 and the fourth reactive metal layer 330D. Alternatively, the synapse 300 may include multiple resistance layers 360, such that one resistance layer 360 may be disposed between the second electrode 340 and the fourth reactive metal layer 330D, and another resistance layer 360 may be disposed between the first electrode 310 and the oxygen-containing layer 320.

The neuromorphic device according to the above-described embodiments may be used in various devices or systems. This will be described by way of example with reference to FIG. 6.

Figure 6:
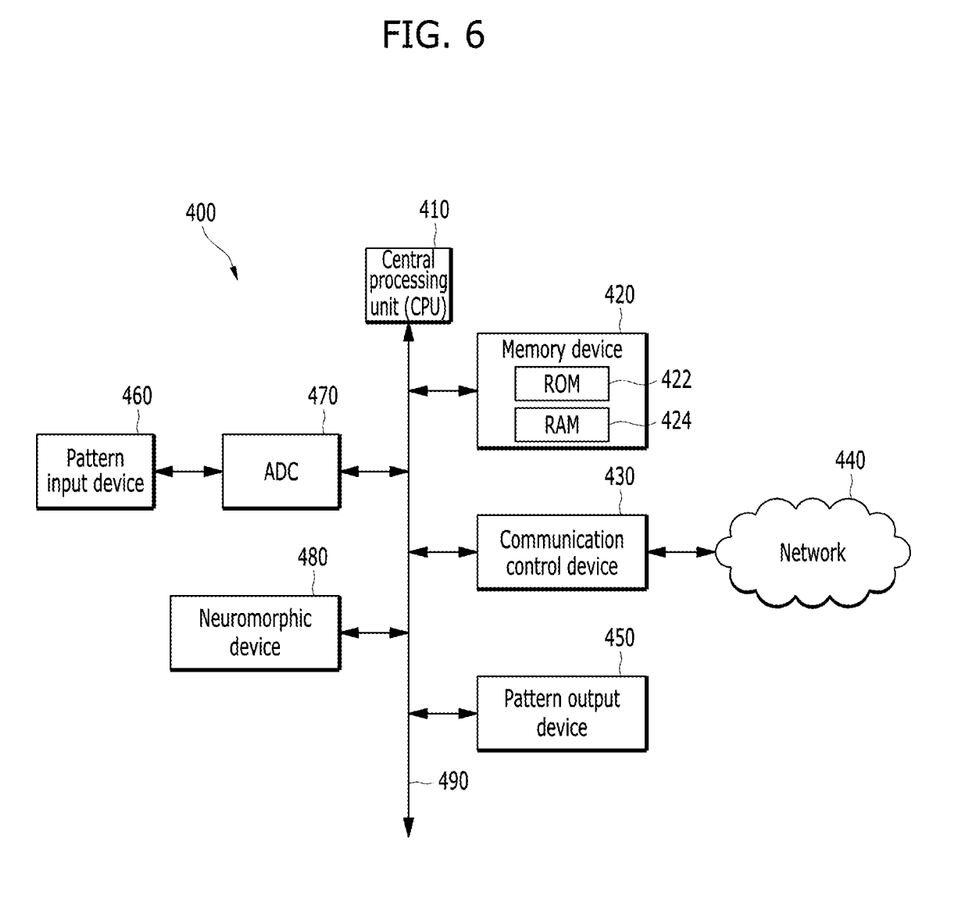
FIG. 6 shows a pattern recognition system according to an embodiment.

FIG. 6 shows a pattern recognition system 400 according to an embodiment.

The pattern recognition system 400 may be a system for recognizing various patterns, such as a speech recognition system or an image recognition system. The pattern recognition system 400 may be configured with the neuromorphic device of the above-described embodiments.

Referring to FIG. 6, the pattern recognition system 400 may include a central processing unit (CPU) 410, a memory device 420, a communication control device 430, a pattern output device 450, a pattern input device 460, an analog-digital converter (ADC) 470, a neuromorphic device 480, a bus line 490, and the like. The pattern recognition system 400 is connected to a network 440 through the communication control device 430.

The central processing unit 410 may generate and transmit various signals used in a learning operation to be performed by the neuromorphic device 480, and may perform various processing operations for recognizing patterns of sound, images, or the like based on an output of the neuromorphic device 480. This central processing unit 410 may be connected, via the bus line 490, to the memory device 420, the communication control device 430, the pattern output device 450, the analog-digital converter 470, and the neuromorphic device 480.

The memory device 420 may store information in accordance with operations of the pattern recognition system 400. For this, the memory device 420 may include different memory devices. For example, the memory device 420 may include a ROM device 422, a RAM device 424, and the like. The ROM device 422 may store various programs or data which are used in the central processing unit 410 in order to perform the learning operation of the neuromorphic device 480, pattern recognition, etc. The RAM device 424 may store the program or data downloaded from the ROM device 422, or store data, such as sound or images, which have been converted or analyzed by the analog-digital converter 470.

The communication control device 430 may exchange recognized data (e.g., sound or images) with other communication control devices through the network 440.

The pattern output device 450 may output the recognized data (e.g., sound or images) in various manners. For example, the pattern output device 450 may include one or more of a printer, a display unit, and the like, and may output sound waveforms or display images.

The pattern input device 460 may receive analog-type sound, images, etc., and may include one or more of a microphone, a camera, etc.

The analog-digital converter 470 may convert analog data, provided by the pattern input device 460, to digital data, and may also analyze the digital data.

The neuromorphic device 480 may perform learning, recognition, and the like using data provided by the analog-digital converter 470, and may output data corresponding to recognized patterns. The neuromorphic device 480 may include one or more neuromorphic devices that include synapses of the embodiments described above. For example, the neuromorphic device 480 may include a plurality of synapses, and each of the plurality of synapses may include a first electrode; a second electrode spaced apart from the first electrode; an oxygen-containing layer disposed between the first electrode and the second electrode, the oxygen-containing layer including oxygen ions; and a stack structure disposed between the oxygen-containing layer and the second electrode, the stack structure including a plurality of reactive metal layers alternately arranged with a plurality of oxygen diffusion-retarding layers, wherein the plurality of reactive metal layers are capable of reacting with oxygen ions of the oxygen-containing layer, and wherein the plurality of oxygen diffusion-retarding layers interfere with a movement of the oxygen ions from the oxygen-containing layer to the plurality of reactive metal layers. By using this configuration, the symmetry and linearity of the electrical conductivity of a synapse can be ensured. Accordingly, operating characteristics of the neuromorphic device 480 can be improved, and thus operating characteristics of the pattern recognition system 400 may also be improved.

The pattern recognition system 400 may further include other components required for properly performing its function(s). For example, the pattern recognition system 400 may further include one or more input devices such as a keyboard, a mouse, and the like so as to receive various parameters and/or setting conditions for operations of the pattern recognition system 400.

According to the embodiments as described above, the symmetry and linearity of the electrical conductivity of the synapse may be enhanced, and thus the operating characteristics of the neuromorphic device may be improved.

While the present invention has been described with respect to the specific embodiments, it will be apparent to those skilled in the art that various changes and modifications may be made without departing from the spirit and scope of the invention as defined in the following claims.

What is claimed is:

1. A synapse comprising:
a first electrode;
a second electrode spaced apart from the first electrode;
an oxygen-containing layer disposed between the first electrode and the second electrode, the oxygen-containing layer including oxygen ions; and
a stack structure disposed between the oxygen-containing layer and the second electrode, the stack structure including a plurality of reactive metal layers alternately arranged with a plurality of oxygen diffusion-retarding layers,
wherein the plurality of reactive metal layers are capable of reacting with oxygen ions of the oxygen-containing layer,
wherein the plurality of oxygen diffusion-retarding layers interfere with a movement of the oxygen ions from the oxygen-containing layer to the plurality of reactive metal layers, and
wherein an electrical conductivity of the synapse changes depending on a thickness of a dielectric layer generated in at least one of the reactive metal layers along an interface between a corresponding one of the oxygen diffusion-retarding layers and the at least one of the reactive metal layers by a reaction between oxygen of the corresponding one of the oxygen-containing layers and a metal of the at least one of the reactive metal layers.

2. The synapse of claim 1, wherein as the thickness of the dielectric layer increases, the electrical conductivity of the synapse decreases, and as the thickness of the dielectric layer decreases, the electrical conductivity of the synapse increases.

3. The synapse of claim 1, wherein the thickness of the dielectric layer increases when a number of first electrical pulses applied to the synapse increases, the first electrical pulses having a first polarity, the first electrical pulses being applied to the synapse through the first and second electrodes, and
wherein the thickness of the dielectric layer decreases when a number of second electrical pulses applied to the synapse increases, the second electrical pulses having a second polarity opposite to the first polarity, the second electrical pulses being applied to the synapse through the first and second electrodes.

4. The synapse of claim 3, wherein the first electrical pulses have a constant width and a constant magnitude, and the second electrical pulses have a constant width and a constant magnitude.

5. The synapse of claim 1, wherein each of the oxygen diffusion-retarding layers has a thickness allowing the movement of the oxygen ions.

6. The synapse of claim 1, wherein each of the oxygen diffusion-retarding layers comprises a dielectric material, a semiconductor material, or a combination thereof.

7. The synapse of claim 1, further comprising:
a resistance layer located between the first electrode and the oxygen-containing layer, or between the second electrode and the stack structure, or both, the resistance layer increasing a resistance value of the synapse.

8. The synapse of claim 7, wherein the resistance layer comprises a dielectric material, a semiconductor material, or a combination thereof.

9. The synapse of claim 1, wherein the synapse undergoes a depression operation when the electrical conductivity of the synapse decreases as a number of first electrical pulses applied to the synapse increases, the first electrical pulses having a first polarity and being applied to the synapse through the first and second electrodes, and
wherein the synapse undergoes a potentiation operation when the electrical conductivity of the synapse increases as a number of second electrical pulses increases, the second electrical pulses having a second polarity opposite to the first polarity and being applied to the synapse through the first and second electrodes.

10. The synapse of claim 9, wherein a change in the electrical conductivity of the synapse in the potentiation operation is symmetric with a change in the electrical conductivity of the synapse in the depression operation.

11. The synapse of claim 9, wherein a rate of change in the electrical conductivity of the synapse in each of the potentiation operation and the depression operation is constant.

12. The synapse of claim 9, wherein the first electrical pulses have a constant width and a constant magnitude, and the second electrical pulses have a constant width and a constant magnitude.

13. The synapse of claim 9, wherein the electrical conductivity of the synapse is constant when at least one of a width and a magnitude of each of third electrical pulses applied to the synapse is less than a certain critical value, the third electrical pulses having the first polarity or the second polarity.

14. A neuromorphic device comprising:
a first neuron;
a second neuron;
a first line connected to the first neuron, the first line extending in a first direction;
a second line connected to the second neuron, the second line extending in a second direction crossing the first direction; and
a synapse disposed between the first line and the second line in a third direction, the synapse being located at an intersection region between the first line and the second line, the third direction being perpendicular to the first and second directions,
wherein the synapse comprises:
an oxygen-containing layer including oxygen ions; and
a stack structure disposed between the oxygen-containing layer and the second line, the stack structure including a plurality of reactive metal layers alternately arranged with a plurality of oxygen diffusion-retarding layers,
wherein the plurality of reactive metal layers are capable of reacting with oxygen ions of the oxygen-containing layer,
wherein the plurality of oxygen diffusion-retarding layers interfere with a movement of the oxygen ions from the oxygen-containing layer to the plurality of reactive metal layers, and
wherein an electrical conductivity of the synapse changes depending on a thickness of a dielectric layer generated in at least one of the reactive metal layers along an interface between a corresponding one of the oxygen diffusion-retarding layers and the at least one of the reactive metal layers by a reaction between oxygen of the corresponding one of the oxygen-containing layers and a metal of the at least one of the reactive metal layers.

15. The neuromorphic device of claim 14, wherein the electrical conductivity of the synapse decreases as the thickness of the dielectric layer increases, and the electrical conductivity of the synapse increases as the thickness of the dielectric layer decreases.

16. The neuromorphic device of claim 14, wherein the first neuron and the second neuron are configured to drive, through the first line and the second line, the synapse with first electrical pulses having a first polarity or second electrical pulses having a second polarity opposite to the first polarity,
wherein the thickness of the dielectric layer increases with when a number of the first electrical pulses applied to the synapse increases, and
wherein the thickness of the dielectric layer decreases when a number of the second electrical pulses applied to the synapse increases.

17. The neuromorphic device of claim 16, wherein the first electrical pulses have a constant width and a constant magnitude, and the second electrical pulses have a constant width and a constant magnitude.

18. The neuromorphic device of claim 14, wherein the synapse further comprises:
a resistance layer located between the first line and the oxygen-containing layer, or between the second line and the stack structure, or both, the resistance layer increasing a resistance value of the synapse.

* * * * *